UNITED STATES PATENT OFFICE.

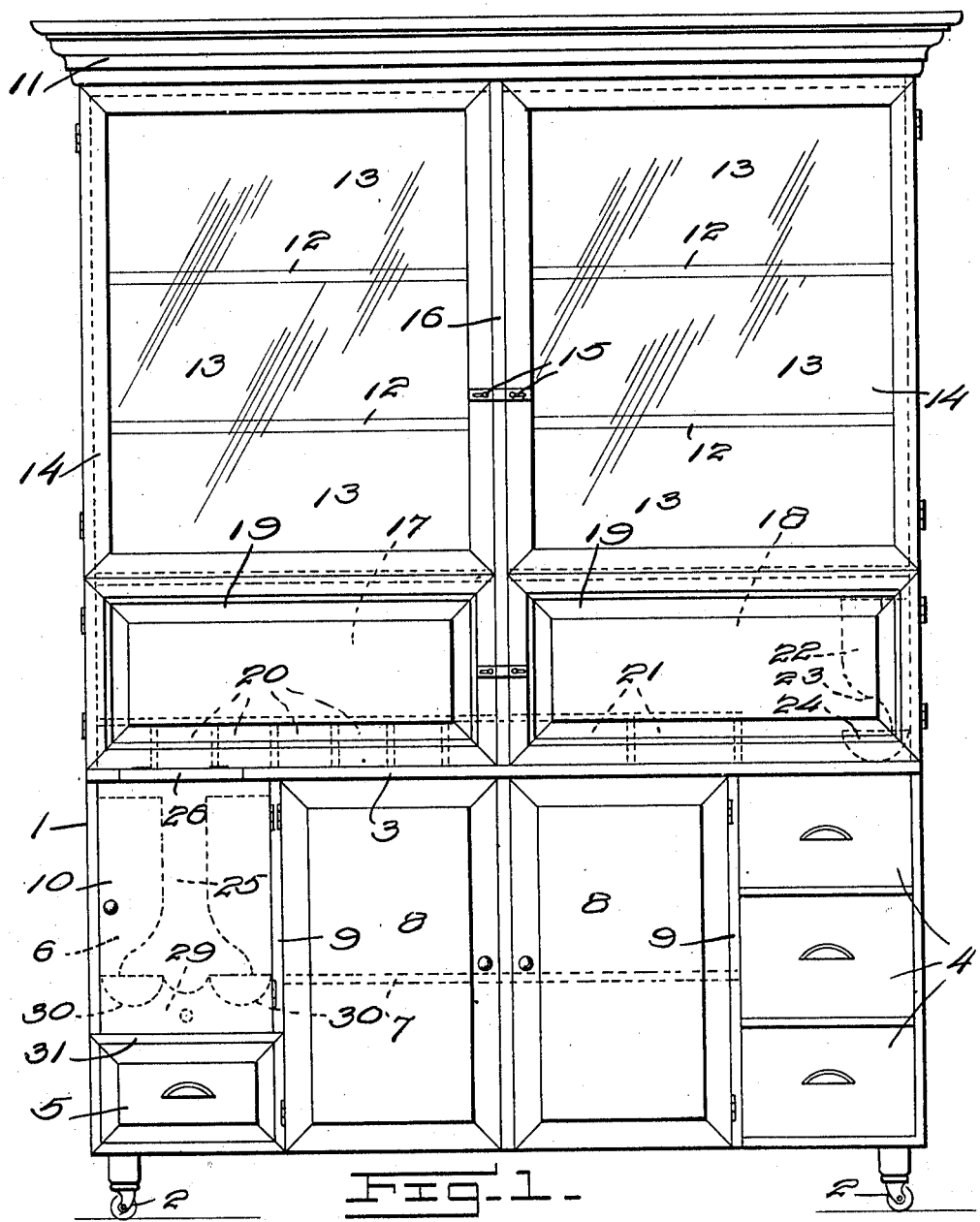

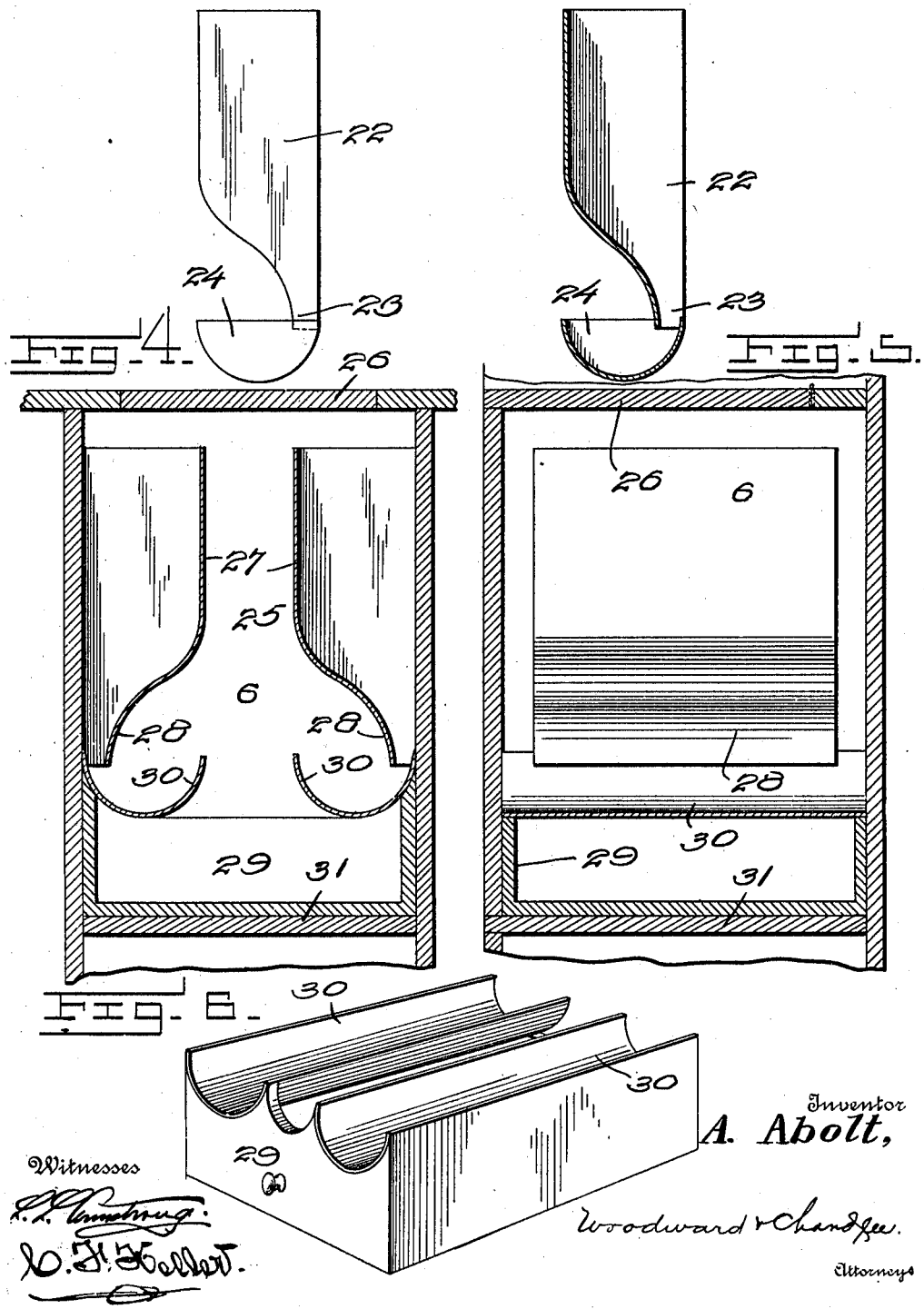

ANGELINE ABOLT, OF TERRE HAUTE, INDIANA.

KITCHEN-CABINET.

982,777.  Specification of Letters Patent.  Patented Jan. 31, 1911.

Application filed August 18, 1910. Serial No. 577,772.

*To all whom it may concern:*

Be it known that I, ANGELINE ABOLT, a citizen of the United States, residing at Terre Haute, in the county of Vigo and State of Indiana, have invented certain new and useful Improvements in Kitchen-Cabinets, of which the following is a specification.

This invention relates to kitchen cabinets and more particularly to those of a portable character.

The object of the invention is to provide a simple, practical and efficient construction and arrangement in an article of furniture of the character described, whereby a maximum amount of storage space is provided for the various articles of culinary use, said articles being adapted to be supported, stored and properly distributed in the most convenient positions for ready access when occasion is required for the use thereof.

A further and very essential object of the invention is in the construction and arrangement of the flour and sugar bins which will hold a sufficient quantity of flour and sugar respectively for all practical use, whereby the food granulated provisions stored therein are conveniently accessible at all times and may be readily removed from the bins at the lower delivery ends of the same.

With these and other objects in view, the present invention consists in the combination and arrangement of parts which will be hereinafter more fully described and particularly pointed out in the appended claims, it being understood that changes in the specific structure shown and described may be made within the scope of the claims without departing from the spirit of the invention.

In the drawings: Figure 1 is a front elevation of the complete invention, showing in dotted lines the various parts located within the cabinet when the doors of the latter are in a closed position. Fig. 2 is an end view of the sugar bin detached from the cabinet. Fig. 3 is a vertical section of the same. Fig. 4 is a vertical section of the flour bin and that portion of the cabinet to which the same is attached. Fig. 5 is a transverse section of that end of the cabinet to which the flour bin is attached. Fig. 6 is a perspective view of the drawer which carries the troughs and adapted for coöperation with the lower delivery ends of the bins.

Referring to the drawings 1 represents a cabinet of suitable design and dimensions and mounted upon suitable casters 2, whereby the cabinet may be conveniently moved to any desirable position. Located at a suitable distance from the base of the cabinet is a counter top 3 which forms a cover for the lower compartments of the cabinet, and located at its right hand end and vertically arranged are a series of drawers 4 which may be used for any purpose, the opposite left hand lower portion of the cabinet being also provided with a drawer 5 and a flour bin 6 located above the same and below the counter top, the construction of which bin will be hereinafter more specifically described. The compartment between the base of the cabinet and the counter top 3 and located between the drawers 4 and the bin 6 and drawer 5, is provided with a shelf 7, the said compartment being closed by panel doors 8 which are hingedly attached to the vertical separating strips 9, a door 10 also being hinged to the said strip 9 for closing the front or delivery end of the flour bin.

The cabinet thus constructed is provided with an ornamental top 11 and the cabinet below the same is provided with shelves 12 providing compartments 13 which are closed by glass doors 14 which are hingedly attached to the opposite ends of the cabinet and are fastened by suitable locking devices 15 which coöperate with the vertical and centrally arranged meeting strip 16 in the usual manner. Located between the compartments 13 and the counter top 3 are two compartments 17 and 18 which are closed by panel doors 19, said doors also being hingedly attached to the opposite ends of the cabinet and provided with locking devices of any well known and approved design. The bottom of the compartment 17 is provided with a series of divisions 20 which are adapted to removably receive spice cups or cans of any well known construction, the adjacent compartment 18 being also provided with two divisions 21 for a coffee and tea can respectively. Positioned within the compartment 18 and secured to the end wall of the cabinet is a sugar bin 22 which is provided with a lower inwardly projecting portion 23 the terminal end of which is located a suitable distance from the back of the bin, whereby a deflecting portion is formed for properly directing the sugar contained within the bin to the delivery trough 24 arranged below the lower edge of the deflected portion 23 of the bin, the trough thus arranged projecting a suitable distance, whereby the sugar located therein may be easily removed. The sugar bin thus constructed will automatically feed the material to the delivery trough as the same is used, holding back the bulk of the same located within the hopper portion of the bin.

The flour bin 6 is of duplicate construction, or in other words two are employed and properly separated providing a space 25 between them, the receiving ends of the bins together with the space being covered by a hinged door 26 said door closing an opening in counter top 3 for convenient access to the bins and space referred to.

The bins are preferably constructed from sheet metal such as galvanized iron and provided with vertical walls 27 having inwardly curved lower portions 28 the terminal edges of which are located or spaced at suitable distances from the walls of the cabinet to which the bins are attached, the end of the cabinet forming one wall of one of the bins and the division strip 9 forming the rear vertical wall of the other bin. The bins thus constructed together with the accompanying parts to be hereinafter described extend the full width of the cabinet, and if so desired it is evident that one of the bins may contain flour and the other meal or any other cereal as may be desired.

Slidingly located below the delivery or lower ends of the bins 6 is a drawer 29. Secured to the opposite sides of the drawer are two longitudinally arranged and suitably spaced curved troughs 30 which receive the lower terminal edges of the bins, the said lower edges being properly spaced in relation to the troughs for holding back the flour or other cereal that may be located within the bins when the said drawer 29 is in a closed position. The inner adjacent edges of the troughs are so separated as to provide a space therebetween to permit the over-flow therefrom to drop into the drawer.

From the foregoing description it will readily be seen that the drawer 29 will receive any waste or escaping material from the troughs 30 in removing said material for use, and when it is desired to entirely remove the contents of the bin for any purpose, the said drawer may be partially or entirely withdrawn from its receiving space below the bins, whereby the contents will be discharged upon the horizontal division wall 31 upon which the drawer slides.

It will be apparent that changes in the form, proportion, and minor details of construction may be resorted to without departing from the spirit or sacrificing any of the advantages of this invention.

What is claimed is:

1. In a kitchen cabinet, a flour bin secured within the base portion thereof, the lower inner wall of which is curved toward the cabinet, the terminal ends of said wall being spaced from the end wall of the cabinet for the free passage of the material contained within the bin, a drawer below the bin and curved troughs in said drawer located below the lower edge of the curved wall of the bin and out of contact therewith, the free edge of said trough being located a suitable distance above the lower edge of the curved wall of the bin, whereby the bulk of the flour or other material located within the bin is prevented from passing out of the trough and is fed to the latter as used.

2. In a kitchen cabinet, two oppositely located bins secured therein, the lower inner portions of which are curved toward the securing portion of the cabinet, with the lower edges thereof out of contact with the walls of the cabinet forming delivery ends for the bins, a drawer slidingly located below the delivery end of the bins, and curved troughs fixed to the opposite sides within the drawer, said troughs being arranged to receive the lower edges forming the delivery ends of the bins with said edges out of contact with the trough, whereby the flour or other material located within the bins is fed to the troughs as used, the drawer thus formed being adapted to receive the escaping material.

In testimony whereof I affix my signature, in the presence of two witnesses.

ANGELINE ABOLT.

Witnesses:
W. D. FUQUA,
F. F. KUHLMAN.